(12) United States Patent
Hinc et al.

(10) Patent No.: US 9,193,221 B2
(45) Date of Patent: Nov. 24, 2015

(54) TIRE COMPRISING A CONDUCTING WIRE PASSING THROUGH ELECTRICALLY NON-CONDUCTING CROWN REINFORCING PLIES, DEVICE AND ASSOCIATED METHOD

(75) Inventors: Henri Hinc, Romagnat (FR); Jean-Marie Dettorre, Clermont-Ferrand (FR)

(73) Assignees: Michelin Recherche et Technique S.A., Granges-Paccot (CH); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 1221 days.

(21) Appl. No.: 13/124,794

(22) PCT Filed: Oct. 12, 2009

(86) PCT No.: PCT/EP2009/063243
§ 371 (c)(1),
(2), (4) Date: Sep. 12, 2011

(87) PCT Pub. No.: WO2010/043577
PCT Pub. Date: Apr. 22, 2010

(65) Prior Publication Data
US 2011/0308675 A1    Dec. 22, 2011

(30) Foreign Application Priority Data
Oct. 17, 2008  (FR) ...................... 08 57073

(51) Int. Cl.
*B60C 19/08* (2006.01)
*B29D 30/06* (2006.01)
*B29D 30/00* (2006.01)
*B60C 9/20* (2006.01)
*B29D 30/52* (2006.01)

(52) U.S. Cl.
CPC ............ *B60C 19/08* (2013.01); *B29D 30/0061* (2013.01); *B60C 9/20* (2013.01); *B29D 2030/526* (2013.01)

(58) Field of Classification Search
CPC .... B60C 19/08; B60C 19/082; B60C 19/084; B60C 2001/0066; B60C 1/0016; B60C 1/0083; B60C 9/0057; B60C 9/20; B60C 19/086; B60C 19/088; B29D 2030/526; B29D 2030/061; B29D 30/06
USPC .................. 152/152.1, DIG. 2; 156/110.1
See application file for complete search history.

(56) References Cited

U.S. PATENT DOCUMENTS

| 6,289,958 B1 * | 9/2001 | Dheur et al. ............... 152/152.1 |
| 2004/0069386 A1 * | 4/2004 | Janajreh et al. ............ 152/152.1 |
| 2006/0102264 A1 * | 5/2006 | Nicolas ....................... 152/152.1 |

FOREIGN PATENT DOCUMENTS

| CH | 597 008 | 3/1978 |
| FR | 1 198 271 | 12/1959 |

(Continued)

OTHER PUBLICATIONS

WO 98/38050, Sep. 1998, English language machine translation [http://www.epo.org].*

*Primary Examiner* — Eric Hug
(74) *Attorney, Agent, or Firm* — Cozen O'Connor (57) ABSTRACT

A tire comprising a crown reinforcing belt formed of a plurality of reinforcing plies (13, 14) superposed on one another, each reinforcing ply comprising mutually parallel threads coated in a weakly electrically conducting rubber compound and making a given angle with the said circumferential direction, characterized in that one strand of electrically conducting thread (20) passes right through the belt at a given point, and in that a first free end (21) of the said strand runs along the radially external face of the said belt and that the second free end of the said strand (22) runs along the radially internal face of the said reinforcing belt.

13 Claims, 6 Drawing Sheets

(56) References Cited

FOREIGN PATENT DOCUMENTS

| FR | 2 759 946 | 8/1998 | |
| JP | 60-182204 | 12/1985 | |
| JP | 2000-085316 | 3/2000 | |
| JP | 2001-212869 | 8/2001 | |
| JP | 2006-143208 | 6/2006 | |
| WO | WO 98/38050 | * | 9/1998 |

* cited by examiner

TIRE COMPRISING A CONDUCTING WIRE PASSING THROUGH ELECTRICALLY NON-CONDUCTING CROWN REINFORCING PLIES, DEVICE AND ASSOCIATED METHOD

RELATED APPLICATION

This is a U.S. National Phase Application under 35 USC 371 of International Application PCT/EP2009/063243, filed on Oct. 12, 2009.

This application claims the priority of French patent application no. 08/57073 filed Oct. 17, 2008, the entire content of which is hereby incorporated by reference.

FIELD OF THE INVENTION

The field of the invention relates to tires intended to be mounted on transport vehicles. More specifically, the invention deals with the problem of the flow of electrical charge through tires made of electrically non-conducting rubber compounds.

BACKGROUND OF THE INVENTION

With a view to improving the rolling resistance and to reducing fuel consumption, modern tires contain rubber compounds which, by way of fillers, contain predominantly electrically non-conducting fillers such as silica, which are used, for example, to create the tread strips. A tire of this type is descried, by way of illustration, in publication EP 0 501 227.

Because of the very high resistivity of these compounds, their use has been accompanied by the development of numerous technical solutions aimed at avoiding the build-up of static electricity and at allowing charge to flow to the ground as the vehicle drives along. The disadvantages associated with the build-up of electrical charge are well known to equipment manufacturers and are as wide ranging as disrupting the operation of the radio fitted in the vehicle, causing the occupant to suffer electric shock as he or she gets out of the vehicle, and accelerated ageing of the tire as a result of the creation of ozone.

Hence, tire manufacturers are seeking to market tires which do not have these disadvantages. U.S. Pat. No. 5,518,055 describes a tire of which the tread strip, made from a non-conducting compound, is coated with a thin layer of conducting compound. This layer is in contact with the side wall compounds, which are themselves also electrically conducting, to allow electrical charge to flow.

Another solution set out in publication EP 0 658 452 is to place an insert in the tread strip. This insert, which extends radially, preferably over the entire circumference of the tire, is made out of an electrically conducting rubber compound and connects the external surface of the tread strip either to one of the crown reinforcing plies, each of these plies being electrically conducting, or to any other part adjacent to the tread strip of the tire and which is sufficiently electrically conducting. Numerous improvements have been made to this principle, according to whether the tread strip comprises one or several layers of conducting or non-conducting materials, and these are set out by way of example in publications EP 0 925 903 or EP 0 963 302.

All these methods are aimed at connecting the external surface of the tread strip to a part of the internal region of the crown of the tire immediately adjacent to it, such as the side wall, a crown reinforcing ply or a carcass reinforcing ply, and which has properties of electrical conductivity.

However, recent developments in tires, again aimed at improving the rolling resistance, have led to more widespread use of weakly electrically conducting compounds, based on silica, in most of the parts of the tire likely to perform mechanical work during the phase in which the said tire is rolling along. Thus, such compounds are used to produce the crown reinforcing plies as well as being used to produce the tread strips.

What is meant by a weakly electrically conducting rubber compound is a material based on rubber and that has a resistivity greater than or equal to $10^8$ Ohms/cm. Likewise, an electrically conducting rubber material is to be understood as meaning a rubber-based material having a resistivity of less than $10^6$ Ohms/cm.

SUMMARY OF THE INVENTION

It is an object of the invention to provide a means of conducting electrical charge between the radially external part and the radially internal part of a crown belt of the above type.

Another object of the invention is to provide a device and a method for implementing the device which can be used to produce a tire according to the invention.

This and other objects are attained in accordance with one aspect of the present invention directed to a crown reinforcing belt formed of a plurality of reinforcing plies superposed on one another, each reinforcing ply comprising mutually parallel threads coated in a weakly electrically conducting rubber compound having an electrical resistivity greater than or equal to $10^8$ Ohms/cm, and making a given angle with the said circumferential direction, characterized in that one strand of electrically conducting thread passes right through the belt in the radial direction, and in that a first free end of the said strand runs along the radially external face of the said belt and that the second free end of the said strand runs along the radially internal face of the said reinforcing belt.

An embodiment of the invention relates to a tire intended to be mounted on a wheel and especially designed to reduce the rolling resistance, the tire comprising:

A tread strip, the radially external surface of which is intended to be in contact with the ground. The said tread strip is, as a general rule, made up of a weakly electrically conducting compound and comprises a means for conducting electricity, as described for example in publication EP 0 658 452.

A crown reinforcing belt, formed of a plurality of reinforcing plies superposed on one another. Each reinforcing ply comprises mutually parallel threads coated in a weakly electrically conducting rubber compound and making a given angle with the said circumferential direction. The reinforcing plies may result from the winding of several sections of ply positioned on one another or from the laying of the threads directly onto the supporting surface.

The crown reinforcing belt is in contact with the radially internal surface of the tread strip and, more specifically, with the means of conducting electricity which is arranged in the tread strip.

A bead region intended to ensure close contact between the wheel and the tire, comprising bead reinforcing hoops and bead cushions in contact with the wheel, the said bead cushions being formed, as a general rule, from an electrically conducting rubber compound.

One or more carcass reinforcing plies superposed on one another and anchored by their radially internal ends to the bead reinforcing hoops and also comprising threads coated in an electrically conducting rubber compound. The threads are parallel to one another and make a given angle, generally of 90°, with the circumferential direction. At its middle, the carcass reinforcing ply is in contact with the radially internal ply of the crown reinforcing belt.

A side wall region, intended to protect the carcass reinforcing ply and formed, as a general rule, from a weakly electrically conducting rubber compound.

The term thread is to be understood in its very broadest sense, encompassing a monofilament, a multifilament, a cord or a folded yarn or equivalent assembly, and irrespective of the textile or metallic material of which the thread is formed or of the treatment it may undergo, for example a rubberizing or surface treatment to encourage it to bond closely with rubber.

This tire is characterized in that one strand of electrically conducting thread passes right through the belt at a given point, and in that a first free end of the said strand of electrically conducting thread runs along the radially external face of the said crown reinforcing belt and that the second free end of the said strand runs along the radially internal face of the said crown reinforcing belt.

All that is then required is for the first free end of the said section to be placed in contact with the internal surface of the tread strip. If the latter is also formed of a weakly electrically conducting material, then means will need, in the known way, to be provided to allow electricity to be conducted between the exterior surface of the tread strip intended to be in contact with the ground and the radially internal part of the tread strip and this means, such as an insert, will need to be placed in contact with the first free end of the said strand of conducting thread running along the radially external surface of the crown belt.

Likewise, the second free end of the strand of thread is in contact with the radially external surface of the carcass reinforcing ply. If the latter is formed of a weakly electrically conducting rubber material, then once again, in the known way, means will need to be provided for conducting electricity from the radially upper face of the central part of the carcass reinforcing ply to the internal faces of the bead cushions, and for the said second free end of the said strand of electrically conducting wire to be positioned in such a way that it is in contact with the said means placed on the carcass reinforcing ply.

In this way, it is possible to ensure that electrical charge is conducted from the exterior surface of the tread strip in contact with the ground as far as the rim of the wheel.

Another aspect of the invention is directed to a device intended to produce a tire of the type described in the preceding paragraphs.

The function of such a device is to pierce right through the crown reinforcing ply so that a strand of electrically conducting thread as described above can be laid. This device comprises:

a rotary supporting surface intended to support the said reinforcing plies, the said supporting surface comprising an orifice, a means of storing and feeding a continuous thread, a hollow needle through which the said thread passes, capable of moving in the radial direction through the orifice in the supporting surface, and a cutting means, arranged on the same side as a first radial face of the supporting surface, and The device may also comprise a means capable of holding the thread, positioned on the same side as a second face of the supporting surface which is the opposite side to the said first radial face.

The supporting surface comprises two faces. One of them is positioned radially on the outside and corresponds to the surface on which the reinforcing plies that make up the reinforcing belt are deposited by winding. This face by extension comprises the radially external face of the reinforcing belt. The other face of the supporting surface corresponds to the radially internal face of the supporting surface. What is meant by first radial face is the internal or external face of the supporting surface on the same side as the hollow needle and its translational drive mechanism and cutting means are situated. By symmetry, what is meant by the second radial face is the respectively external or internal face on the same side as the means able to hold the thread is situated.

It then follows that the piercing of the reinforcing ply can be achieved by passing through the ply radially from the radially external face to the radially internal face or conversely from the radially internal face to the radially external face.

The method of implementing the device comprises the steps during which:

one or more crown reinforcing plies is or are placed on the said supporting surface, the tip of the hollow needle from which a leader of given length λ has already been extracted is brought closer to the said first radial face, by passing through the orifice in the supporting surface, the crown belt is pierced right through by moving the said hollow needle radially from the first radial face to the second radial face so that the said lead is deposited on the same side as the said second radial face, the needle is withdrawn by effecting a movement in the opposite direction to the movement of the preceding step, while at the same time causing the thread to run along inside the said needle until the length of thread comprised between the tip of the hollow needle and the first radial face is substantially equal to a predetermined length, the portion of thread comprised between the tip of the hollow needle and the first radial face is cut off by activating the cutting means.

When the device comprises means able to hold the thread, the said means are activated before the needle is withdrawn so as to hold the thread on the same side as the second radial face, and the end of the said thread located on the same side as the second radial face is gripped throughout the movement of the needle. The said means are deactivated after cutting so as to release the leader, so that the two free ends of the strand of electrically conducting thread thus formed are located respectively radially on each side of the reinforcing belt.

BRIEF DESCRIPTION OF THE DRAWINGS

The following description provides a better understanding of the invention and relies on particular exemplary embodiments and on FIGS. 1 to 7 in which.

DETAILED DESCRIPTION OF THE DRAWINGS

Figure 1:
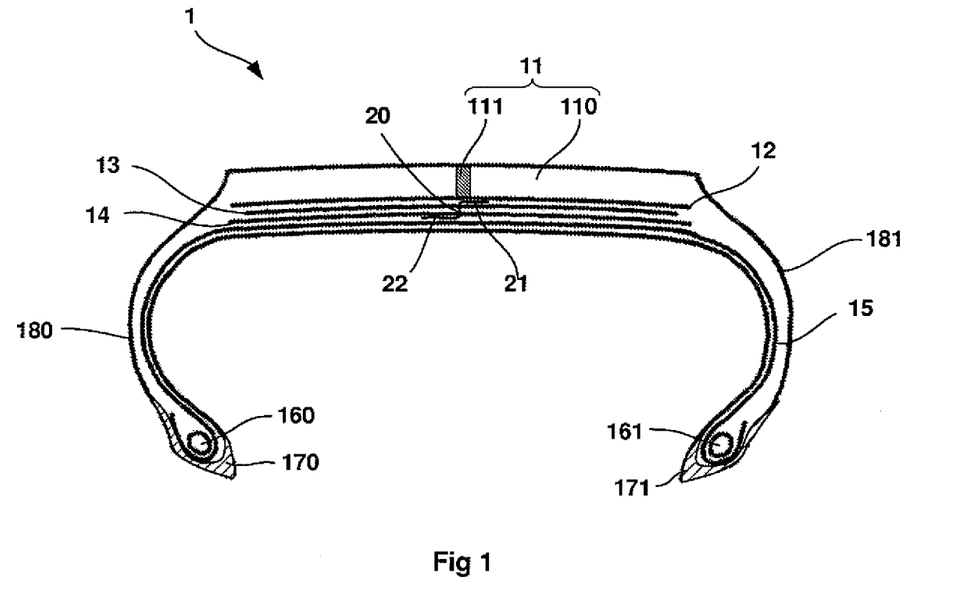
FIG. 1 depicts a section through a tire according to the invention.

The tire 1 depicted in FIG. 1 comprises a tread strip 11 which comprises means 110, 111, 12 for conducting electricity between the exterior surface of the tread strip intended to be in contact with the ground and the radially internal part of the said tread strip.

These means may consist in providing a tread strip produced out of an electrically conducting rubber material or, preferably, in producing a tread strip 11 formed from a weakly electrically conducting compound 110 and comprising an insert 111 passing radially through the tread strip. The tread strip 11 may also comprise a sublayer 12, itself formed of an electrically conducting compound or comprising a means of allowing charge to flow which is similar to that of the tread strip.

The crown reinforcing belt featured in the cross section of tire used as a basis for this description is made up of two reinforcing plies 13 and 14 the threads of which make a given angle with the circumferential direction of the tire. A strand of conducting thread 20 passes right through the crown belt at a given point, so that a first free end 21 of the strand 20 runs along the radially external face of the crown belt and that the second free end 22 of the strand 20 runs along the internal face of the crown belt. This exemplary embodiment is not of course limiting and the crown belt may be made up of several non-conducting plies and comprise crossed plies or plies formed by the winding of a strip or of a thread that makes a zero angle with the circumferential direction of the said plies or strips at zero degrees.

The carcass reinforcing ply 15 is anchored by its two radially lower ends to the bead reinforcing hoops 160 and 161. The carcass reinforcing ply may consist of threads coated in an electrically conducting compound or, if such is not the case, may comprise means for conducting electricity from the radially external surface of the said carcass reinforcing ply as far as the bead cushions. The central part of the said carcass reinforcing ply 15 is in contact with the radially internal face of the said crown reinforcing belt. Arrangements are therefore made for the second free end 22 of the strand of conducting thread 20 to be in contact with the said means.

The bead cushions 170 and 171, intended to provide contact between the beads of the tire and the rim of the wheel are in contact with the carcass reinforcing ply 15 and comprise a means allowing electricity to be conducted from the internal part to the external part in contact with the rim of the wheel. For preference, these bead cushions 170 and 171 are made using an electrically conducting rubber compound.

Finally, the tire 1 comprises side wall cushions 180 and 181. The nature of the rubber compound, whether or not it conducts electricity, that makes up these cushions is of no importance in the context of the present description but could possibly contribute to the flow of electrical charge in the case of a tire produced to a different construction.

Electrical charge flows in succession through:
the tread strip 11 which comprises means 111, 12 for establishing an electrically conducting path between the radially external part of the tread strip intended to be in contact with the ground and the radially internal part 12 of the said tread strip 11,
the first free end 21 of the strand of conducting thread 20 which is in contact with the sublayer 12, the strand of conducting thread 20, and the second free end of the said strand which is in contact with the carcass reinforcing ply,
the carcass reinforcing ply which is in contact with the bead cushions 170, 171, the latter being intended to make contact with the rim of the wheel.

Figure 2:
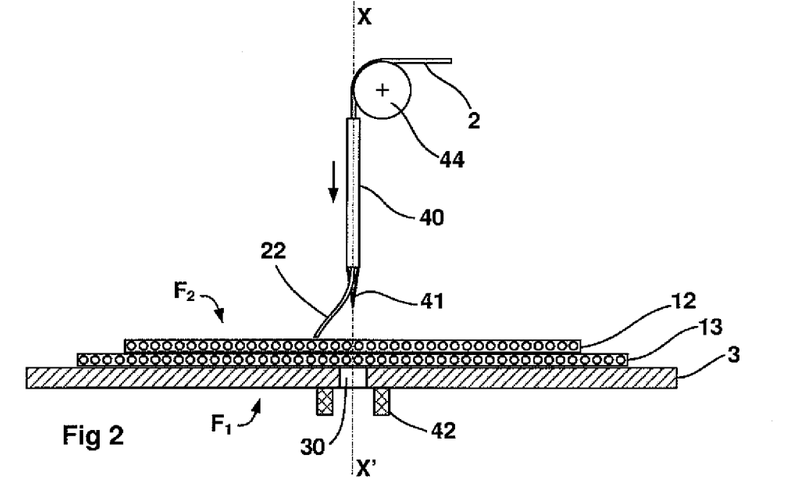
FIGS. 2, 3, 4, 5 and 6 depict the main steps in the use of a piercing device according to a first embodiment of the invention.

FIG. 2 depicts a piercing device according to the invention able to position a strand of electrically conducting thread 20 on each side of the crown reinforcing belt.

The supporting surface 3 is depicted schematically. The reinforcing plies 12 and 13 are placed on the radially external part of the supporting surface 3. An orifice 30 passes right through the supporting surface 3.

A continuous thread 2 taken from a storage and feed means (not depicted), passes around a pulley 44 and enters the internal cannula of a hollow needle 40 positioned in the radial direction XX' and the radially lower tip 41 of which is sharpened. Hence, because of the position of the hollow needle 40, the first radial face $F_1$ consists, in this exemplary embodiment, of the radially external face of the supporting surface 3 on which the crown belt (12, 13) rests.

A leader of thread 22 protrudes from the radially lower part of the hollow needle 41.

Figure 3:
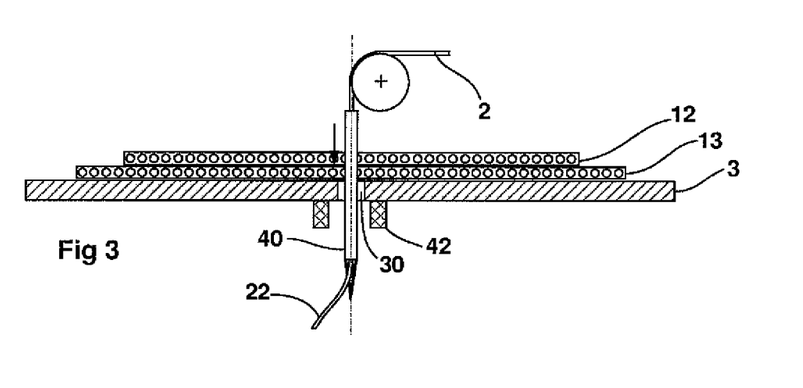
Figure 4:
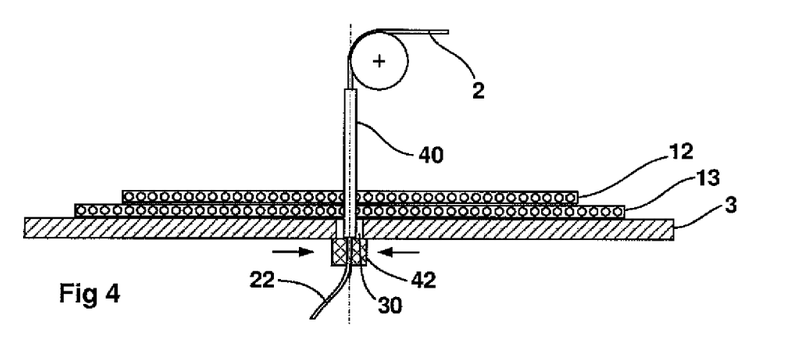
Figure 5:
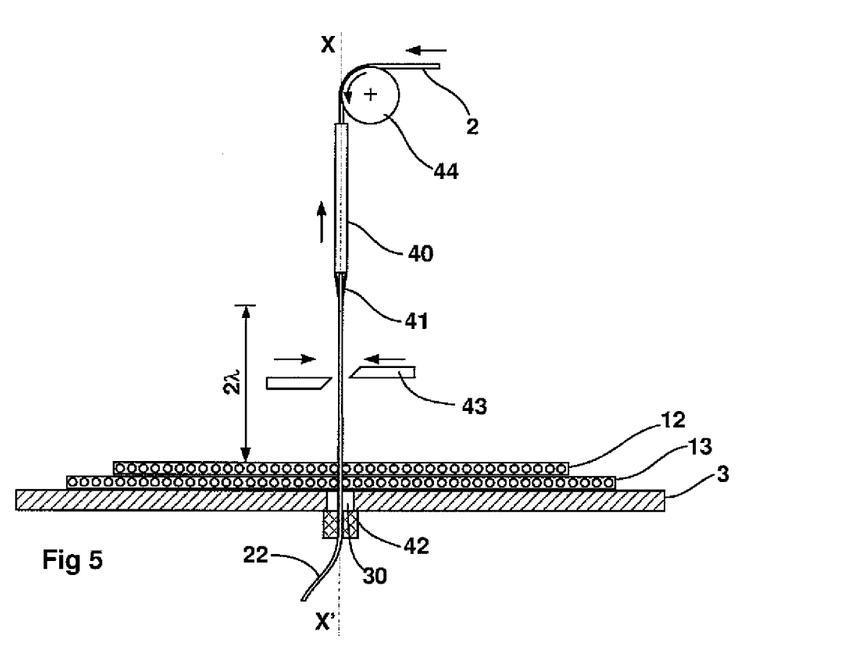
Figure 6:
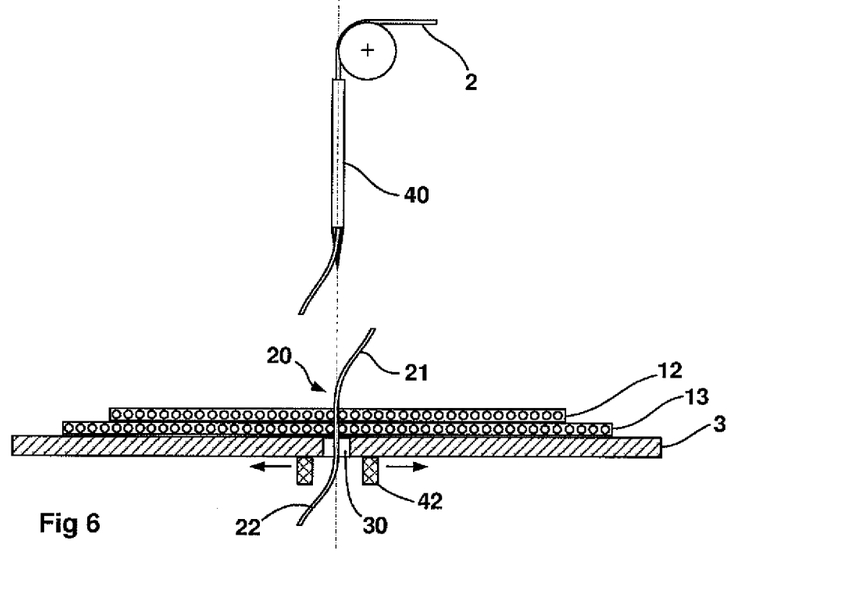

Press pads 42 are situated on the same side as the second radial face $F_2$ of the supporting surface 3. These pads move antagonistically, parallel to a plane perpendicular to the radial direction XX'. In the open position as illustrated in FIG. 3 they allow the hollow needle 40 to pass through the orifice 30. In the closed position as illustrated in FIG. 4, they grip the tip of the needle 42 and the leader of thread 22 so as to hold the said lead on the same side as the second radial face and thus prevent the thread from passing back through the orifice 30. It is possible to substitute any other means for the press pads which here represent a simplified form of a means capable of holding the thread.

FIG. 2 illustrates the first step in the use of the device during which the hollow needle 40 is driven through the crown reinforcing belt, passing through the orifice 30 in the supporting surface 3. The hollow needle effects a radial movement in the direction XX', in a direction directed from the first radial face $F_1$ towards the second radial face $F_2$, namely, in this particular instance, from the radially external face of the supporting surface towards the radially internal face of the supporting surface 3. The travel of the hollow needle 40 is adjusted so that, during this downwards movement, the entire lead is passed to the other side of the second radial face $F_2$.

The hollow needle then effects a movement in the opposite direction to the first, until the tip 41 of the needle lies level with the gripping pads 42. The pads 42 are then closed so as to press the leader 22 of the thread and hold it on the same side as the second radial face $F_2$, as has been illustrated in FIG. 4.

It will be noted at this stage that the supporting surface is formed of the radially external part of a mechanical means such as a cylinder, the thickness of which is non-zero. Hence, the orifice 30 which passes through the supporting surface to allow for the passage of the hollow needle 40 may have a certain length in the radial direction. It therefore follows that the radial travel of the hollow needle and the length of the leader 22 need to be tailored to suit the position of the press pads 42 so that the said lead can easily be gripped by the said press pads 42. Steps will be taken to ensure that the said press pads are situated as close as possible to the supporting surface.

The supporting surface may also be formed of the surface of a solid cylinder or of a cylindrical tube of inappropriate thickness. In this particular case, use of the invention would entail producing a housing under the supporting surface in which to install the hollow needle and the cutting means, if the radially internal face is considered to be the first radial face $F_1$, or the means capable of holding the thread if the radially internal face is considered to be the second radial face $F_2$.

Once the leader 22 has been gripped by the press pads 42, the thread is immobilized in the direction from the lower radial face $F_2$ towards the upper radial face $F_1$.

By continuing the needle return movement, the thread is made to run along inside the hollow needle and the thread feed means, here represented by the rotating of the roller 44, are activated. This then releases a certain quantity of thread of a predetermined length, between the tip 41 of the needle 40 and the supporting surface. Steps will be taken to ensure that this quantity is substantially equal to twice the length λ of the leader 22.

The cutting means 43 are then actuated to cut the thread 2 and form a strand of thread 20. By cutting the thread mid-height, that is to say at a distance λ from the tip 41 in the direction towards the supporting surface, it is possible to prepare the leader of thread that will be used for the next piercing operation.

The strand of electrically conducting thread 20 obtained therefore comprises a first free end 21 positioned on the same side as the radially external face of the reinforcing belt, and a second free end 22 positioned on the same side as the radially internal face of the reinforcing belt. When the reinforcing belt is laid on the carcass reinforcing ply, the free end 22 of the strand of conducting thread 20 will be brought into contact with the radially external face of the carcass reinforcing ply and, as the tread strip is laid, the free end 21 of the strand of conducting thread 20 will be brought into contact with the radially internal face of the said tread strip, so as to produce a tire according to the invention, as depicted in FIG. 1.

FIGS. 7 to 11 illustrate the main steps in the production of a device according to a second embodiment of the invention making it possible to produce tires according to the invention. The device in question is a simplified form of the device described in the preceding paragraphs. According to this embodiment, the device has no means for holding the thread on the same side as the second radial face.

It has been found that the rubber compound of which certain plies are formed is sufficiently elastic and sticky to hold onto the thread leaving the needle, when the said hollow needle 40 effects its return movement from the lower radial face $F_2$ to the upper radial face $F_1$. The thread is then gripped by the rubber at the precise instant that the tip 41 of the hollow needle 40 emerges from the ply and at which the thread finds itself in contact with the lips of the hole made by the needle 40.

The sequence of needle and thread movements is substantially the same as that described previously but differs therefrom in that the steps in which the means of holding the thread are activated or deactivated are excluded.

The hollow needle 40 can pierce right through the crown ply at any point on its surface of the reinforcing belt. However, a point on the surface of the belt for which the two free ends 21 and 22 of the strand of conducting thread 20 can be in contact with the conducting parts situated radially above and below the reinforcing belt will be chosen.

The strand of thread must be long enough to be able to ensure electrical contact with the radially internal part of the tread strip and the radially external part of the carcass reinforcing ply. In practice, a strand of a length of between 30 mm and 100 mm is able to meet all dimensional requirements. By way of indication, a length of 50 mm has been enough to satisfy most sizes intended to be fitted to passenger cars.

Likewise, it has been found that the thread curves and bends about the tip of the needle as the needle penetrates the rubber compound. This has the effect, particularly when the conducting thread chosen is a metal thread, of directing the end of the thread towards the surface of the crown belt. This is depicted in FIGS. 8, 9, 10 and 11.

This particular orientation allows the thread to be caught more easily by anchoring the end of the thread which forms a kind of barbed hook, in the radially internal surface of the crown so as to prevent the thread from riding back up as the hollow needle is raised again.

The conducting thread 20 may be a thread of a metallic kind coated or not coated in an electrically conducting rubber compound. It is also conceivable to choose a thread of textile type coated in an electrically conducting compound.

For preference, the thread chosen will be a thread that has sufficient elastic properties that it does not locally hamper the radial or circumferential expansion of the crown reinforcing belt during subsequent operations in the manufacture of or during use of the tire.

For this purpose, and in order to limit the abovementioned hampering effect, it is preferable for the thread to be installed in the central region of the tire, that is to say close to the equator, at a location where tire deformation is small. Close means a circumferential region the width of which is substantially equal to half the width of the tire and which extends symmetrically on each side of the equator.

Figure 7:
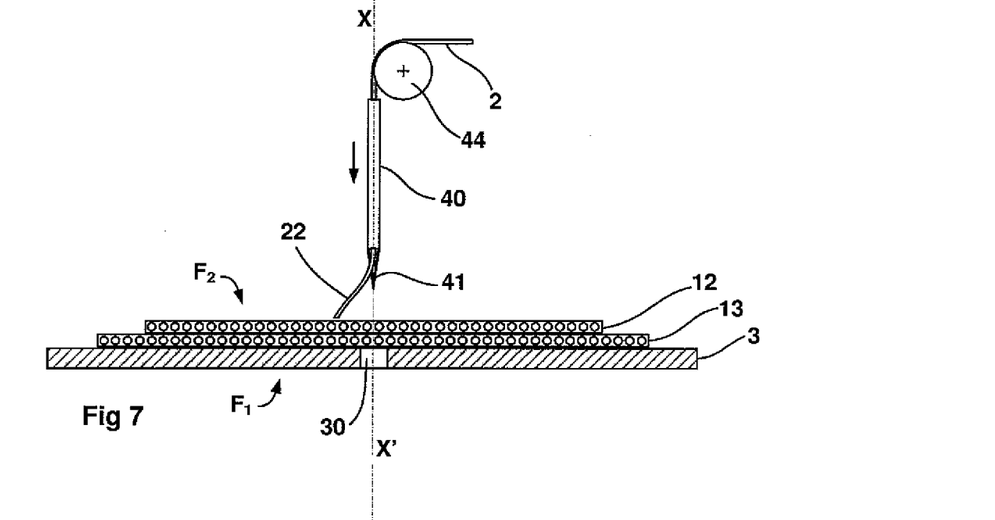
FIGS. 7, 8, 9, 10 and 11 depict the main steps in the use of a piercing device according to a second embodiment.
Figure 8:
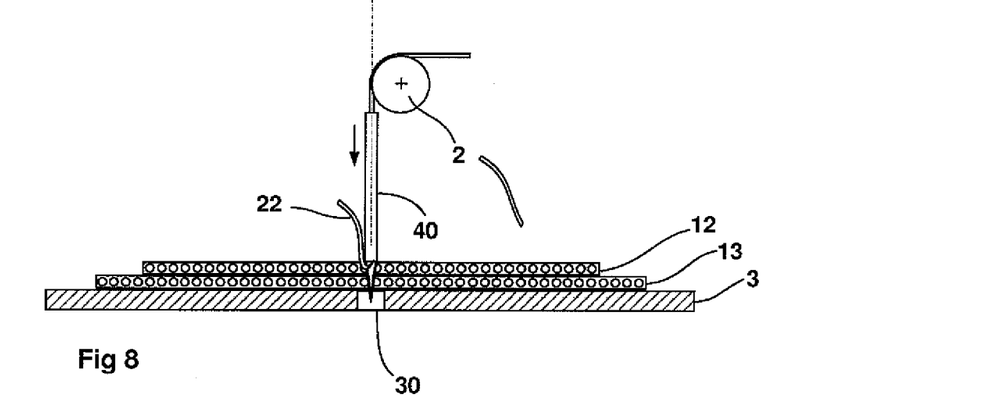
Figure 9:
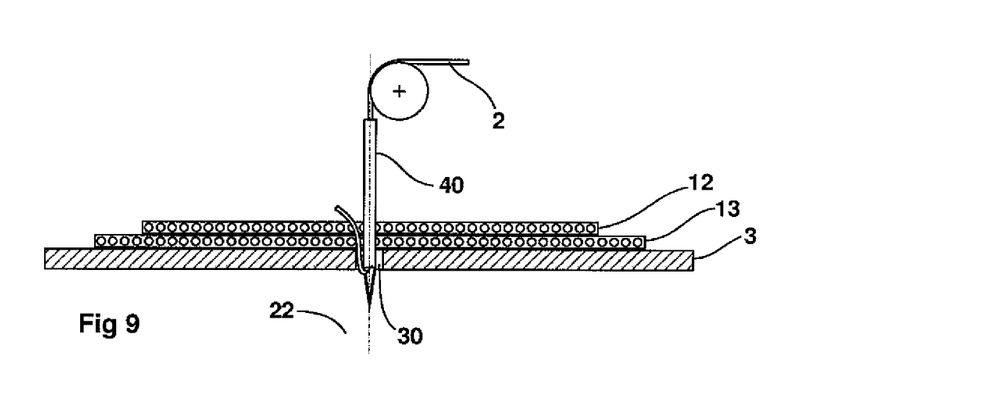
Figure 10:
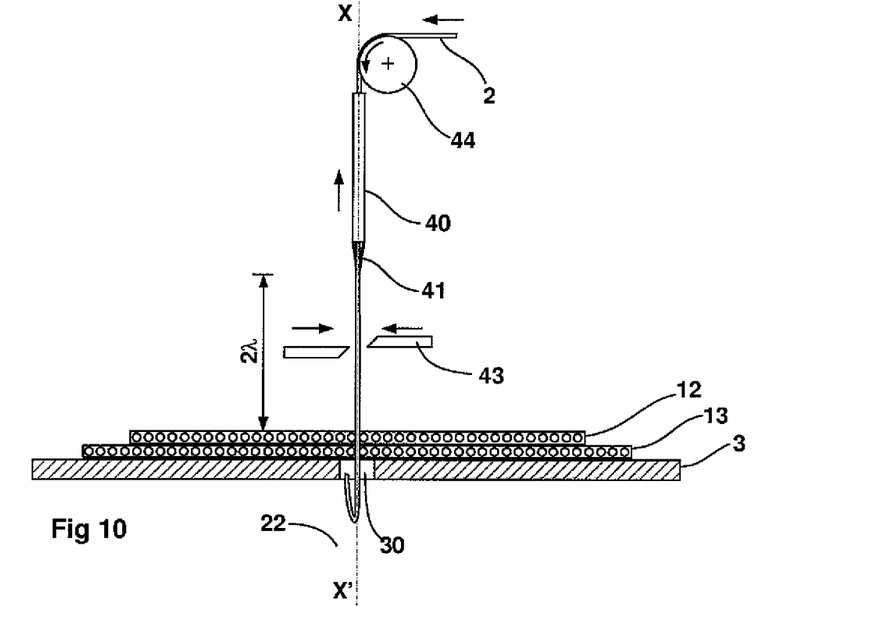
Figure 11:
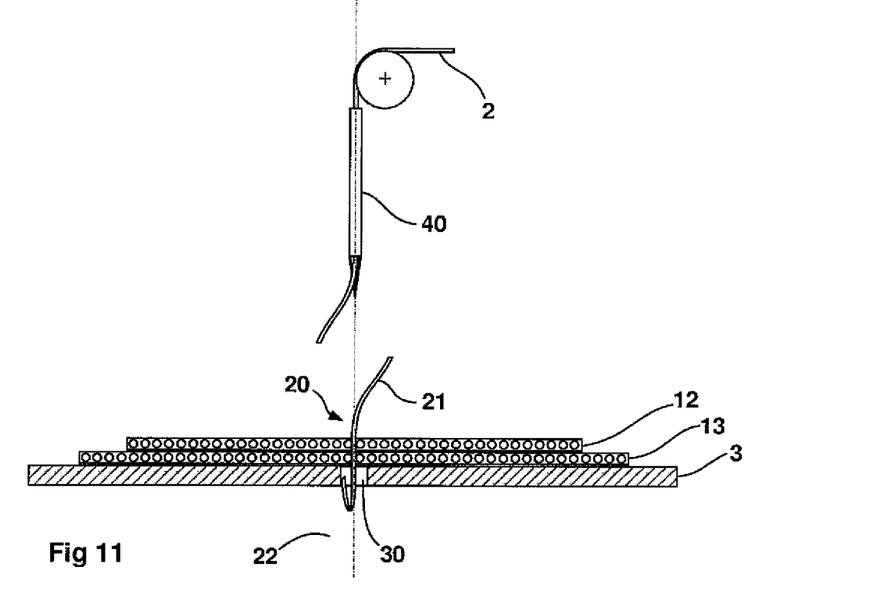
Figure 12:
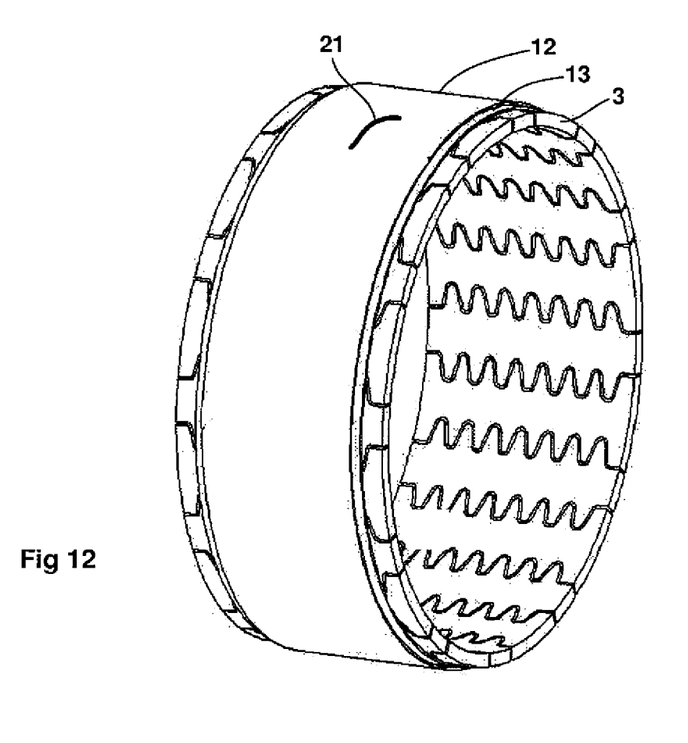
FIG. 12 is a schematic perspective view of one example of a supporting surface on which a crown reinforcing belt through which a strand of conducting thread passes has been positioned.

FIG. 7 depicts an exemplary embodiment of the invention in which the crown belt is placed on a crown finishing form 3 on the external radial face of which the free end 21 of a strand of electrically conducting thread runs.

Finally, it will be noted that the method and device described hereinabove can also be used for laying a strand of conducting thread 20 through any type of weakly electrically conducting rubber product. Thus, it might be possible to contrive for the strand of thread to pass in succession through the crown reinforcing belt and the tread strip so that electrical charge can flow directly from the carcass reinforcing ply to the ground. In such an embodiment, it would be appropriate to choose a thread of a metallic type, preferably made of a material that does not readily become oxidized.

The invention claimed is:

1. A tire comprising a crown reinforcing belt formed of a plurality of reinforcing plies superposed on one another, each reinforcing ply comprising mutually parallel threads coated in a weakly electrically conducting rubber compound having an electrical resistivity greater than or equal to $10^8$ Ohms/cm, and making a given angle with a circumferential direction,
   wherein one strand of electrically conducting thread passes right through the belt in the radial direction,
   wherein a first free end of the strand runs along a radially external face of the reinforcing belt, and
   wherein a second free end of the strand runs along a radially internal face of the reinforcing belt.

2. The tire according to claim 1, wherein the strand of electrically conducting thread is a textile thread sheathed in an electrically conducting compound having a resistivity of below $10^6$ Ohms/cm.

3. The tire according to claim 1, wherein the strand of electrically conducting thread is a metal thread sheathed in an electrically conducting compound having a resistivity of below $10^6$ Ohms/cm.

4. The tire according to claim 1, wherein the strand of electrically conducting thread has a length of between 30 mm and 100 mm.

5. The tire according to claim 1, wherein the strand of electrically conducting thread is positioned in a circumferential region a width of which is substantially equal to half a width of the tire and which extends symmetrically on each side of an equator of the tire.

6. The tire according to claim 1, further comprising a tread strip formed of a weakly electrically conducting rubber material having an electrical resistivity greater than or equal to $10^8$ Ohms/cm, in which tread strip is provided a means for conducting electricity between an exterior surface of the tread strip intended to be in contact with the ground and a radially internal part of the tread strip in contact with an external surface of a crown reinforcing belt over which the first end of the strand of conducting thread runs, in which tire the first free end of the strand of electrically conducting thread is positioned in such a way that the first free end is in contact with the electrically conducting means positioned on the radially internal part of the tread strip.

7. The tire according to claim 1, further comprising:
a bead region, comprising bead reinforcing hoops and bead cushions adapted to be in contact with a rim of a wheel, said bead cushions being formed from an electrically conducting rubber compound;
a carcass reinforcing ply anchored by radially internal ends to the bead reinforcing hoops, comprising means for conducting electricity from a radially external surface of a carcass reinforcing ply as far as the bead cushions, the carcass reinforcing ply being, at its middle, in contact with a radially internal face of a crown reinforcing belt, and in which tire the second free end of the strand of electrically conducting thread is positioned to be in contact with a radially external surface of the carcass reinforcing ply.

8. A method of manufacturing a tire comprising a crown reinforcing belt formed of a plurality of reinforcing plies superposed on one another, each reinforcing ply comprising mutually parallel threads coated in a weakly electrically conducting rubber compound having an electrical resistivity greater than or equal to $10^8$ Ohms/cm, and making a given angle with the circumferential direction, characterized in that one strand of electrically conducting thread passes right through the belt in the radial direction, and in that a first free end of the strand runs along the radially external face of the belt and that the second free end of the strand runs along the radially internal face of the reinforcing belt, wherein the method uses a device for piercing the tire reinforcing plies, comprising:
a supporting surface, intended to support the reinforcing plies, said supporting surface comprising an orifice;
a means of storing and feeding a continuous thread;
a hollow needle through which said thread passes, capable of moving in the radial direction through the orifice in the supporting surface;
a cutting means, arranged on the same side as a first radial face of the supporting surface; and
a means capable of holding the thread, positioned on the same side as a second radial face of the supporting surface which is the opposite side to the first radial face,
the method comprising the steps during which:
A. one or more crown reinforcing plies is or are placed on the supporting surface so as to form a crown reinforcing belt;
B. the tip of the hollow needle from which a leader of given length λ has already been extracted is brought closer to the first radial face;
C. by passing through the orifice in the supporting surface, the crown belt is pierced right through by moving the hollow needle radially from the first radial face to the second radial face so that the lead is deposited on the same side as the second radial face;
D. the needle is withdrawn by effecting a return movement in the opposite direction to the piercing movement, while at the same time causing the thread to run along inside the needle until the length of thread comprised between the tip of the hollow needle and the first radial face is equal to a predetermined length; and
E. the portion of thread comprised between the tip of the hollow needle and the first radial face is cut off by activating the cutting means so that the two free ends of the strand of electrically conducting thread thus formed are laid respectively radially on each side of the reinforcing belt.

9. A method of manufacturing a tire comprising a crown reinforcing belt formed of a plurality of reinforcing plies superposed on one another, each reinforcing ply comprising mutually parallel threads coated in a weakly electrically conducting rubber compound having an electrical resistivity greater than or equal to $10^8$ Ohms/cm, and making a given angle with the circumferential direction, characterized in that one strand of electrically conducting thread passes right through the belt in the radial direction, and in that a first free end of the strand runs along the radially external face of the belt and that the second free end of the strand runs along the radially internal face of the reinforcing belt, wherein the method uses a device for piercing the tire reinforcing plies, comprising:
a supporting surface, intended to support the reinforcing plies, said supporting surface comprising an orifice;
a means of storing and feeding a continuous thread;
a hollow needle through which said thread passes, capable of moving in the radial direction through the orifice in the supporting surface; and
a cutting means, arranged on the same side as a first radial face of the supporting surface,
the method comprising the steps during which:
A'. one or more crown reinforcing plies is or are placed on the supporting surface so as to form a crown reinforcing belt;
B'. the tip of the hollow needle from which a leader of given length λ has already been extracted is brought closer to the first radial face;
C'. by passing through the orifice in the supporting surface, the crown belt is pierced right through by moving the hollow needle radially from the first radial face to the second radial face so that the lead is deposited on the same side as the second radial face
D'. the means able to hold the thread is activated so that it holds the leader on the same side as the second radial face during the return movement of the needle;
E'. the needle is withdrawn by effecting a return movement in the opposite direction to the piercing movement, while at the same time causing the thread to run along inside the needle until the length of thread comprised between the tip of the hollow needle and the first radial face is equal to a predetermined length;
F'. the portion of thread comprised between the tip of the hollow needle and the first radial face is cut off by activating the cutting means, and
G'. the means able to hold the thread is deactivated so as to release the leader so that the two free ends of the strand of electrically conducting thread thus formed are laid respectively radially on each side of the reinforcing belt.

10. The method according to claim 9, wherein at the end of step E', the predetermined length of thread comprised between the tip of the hollow needle and the first radial face is substantially equal to twice the length λ.

11. The method according to claim 9, wherein, during step F', the portion of thread comprised between the tip of the hollow needle and the first radial face is cut off at a distance substantially equal to λ away from the tip of the hollow needle.

12. The method according to claim 8, wherein, at the end of step D, the predetermined length of thread comprised between the tip of the hollow needle and the first radial face is substantially equal to twice the length λ.

13. The method according to claim 8, wherein, during step E, the portion of thread comprised between the tip of the hollow needle and the first radial face is cut off at a distance substantially equal to λ away from the tip of the hollow needle.

* * * * *